United States Patent [19]

Gassiat

[11] Patent Number: 5,005,676
[45] Date of Patent: Apr. 9, 1991

[54] DISK FOR DISK-BRAKE

[75] Inventor: Alain L. Gassiat, Montussan, France

[73] Assignee: Societe Anonyme: Carbone Industrie, Bagnolet Cedex, France

[21] Appl. No.: 193,081

[22] Filed: May 12, 1988

[30] Foreign Application Priority Data

May 13, 1987 [FR] France .................. 87 07011

[51] Int. Cl.⁵ .................. F16D 65/12; F16D 65/847
[52] U.S. Cl. .................. 188/218 XL; 188/264 AA; 192/107 CP; 192/113 A; 192/107 C
[58] Field of Search .... 188/218 XL, 264 A, 264 AA; 192/113 A, 107 CP, 70.19, 70.2

[56] References Cited

U.S. PATENT DOCUMENTS

| 2,274,859 | 3/1942 | Eksergian | 188/218 XL |
| 2,333,308 | 11/1943 | Goodwin | 192/107 CP |
| 2,432,842 | 12/1947 | Wellman | 192/107 CX |
| 2,655,236 | 10/1953 | Bachman | 188/264 A |
| 3,394,780 | 7/1968 | Hodkinson | 188/218 XL |
| 3,623,579 | 11/1971 | Hendrickson | 188/218 XL |

FOREIGN PATENT DOCUMENTS

| 1156941 | 12/1957 | France | 188/218 XL |
| 171926 | 8/1986 | Japan | 188/264 AA |

Primary Examiner—George E. A. Halvosa
Attorney, Agent, or Firm—Bacon & Thomas

[57] ABSTRACT

An improved rotor for a disk brake is disclosed having a multi-piece construction. The rotor has a central web extending around a driving drum portion such that the web defines several generally radially extending cooling passages. The central web is mounted on the driving drum portion so as to be capable of sliding laterally, but may not rotate relative to the driving drum. Friction elements, completely separate from the central web, are located on either side of the central web and are mounted on the driving drum so as to be also capable of lateral movement. The friction elements are also prevented from rotating relative to the driving drum portion of the rotor.

7 Claims, 2 Drawing Sheets

DISK FOR DISK-BRAKE

The present invention relates to brakes of the disk-type, used for braking and/or stopping the rotation of a rotary part with respect to a fixed environment carrying a counter-part cooperating with the disk.

BACKGROUND OF THE INVENTION

The technical field of the invention is, more precisely, the single- or multi-disk brakes in carbon-carbon used for braking and/or stopping, specifically but non-restrictively, the rotation of rotary members forming part of land vehicles.

In such technical fields as cited above, it is usual to use carbon-carbon type brakes, comprising at least one rotor disk driven by the rotary part and cooperating therewith, either one stator disk, or small friction plates carried by the fixed environment of the rotary part.

Depending on the type of energy to be controlled, the rotor disk can be produced in carbon-carbon and be equipped with ventilation means permitting the control of the operating temperature.

Accordingly, the disk generally has to be very thick, with channels or conduits of substantially radial orientation formed in its thickness. Such channels allow a centrifugal circulation of air which constitutes a heat-exchanging vehicle controlling the operating temperature. The nominal thickness of such a disk also allows for the necessity of transmitting the braking torque, hence the need for producing carbon-carbon rotor disks of considerable thickness.

Due to the foregoing requirements, the brakes of the aforesaid type are expensive to produce and to use, all the more so as they require to be changed when the thicknesses of the side faces have suffered such a degree of wear that they are no longer capable of transmitting the driving torque.

Such high costs of production and use considerably restrict the application of these brakes, despite the advantages presented by their braking characteristics.

SUMMARY OF THE INVENTION

It is the object of the present invention to overcome the disadvantages explained hereinabove by proposing an improved disk for disk-brakes which is so designed as to allow the use of a noble friction material, such as carbon-carbon or other similar material, only in the active parts of the friction disk.

Another object of the invention is to propose an improved disk, designed so as to be easier and less expensive to produce.

A further object of the invention is to propose an improved disk of which the heat-exchanging properties can be adapted as a function of the proposed application.

Yet another object of the invention is to propose an improved disk, particularly a carbon-carbon type disk, which will be reusable, hence a reduction of the production and operating costs.

These objects are reached according to the invention with an improved disk for disk-brakes which is characterized in that it is composed of a central ventilation web, slidably mounted on a drum driving it in rotation and fixed on the rotary part, and of two wear surfaces or flanges which are freely and movably mounted on either side of the web, on the same driving drum.

BRIEF DESCRIPTION OF THE DRAWINGS

The invention will be more readily understood on reading the following description with reference to the accompanying drawings, in which.

DETAILED DESCRIPTION OF PREFERRED EMBODIMENTS

Figure 1:
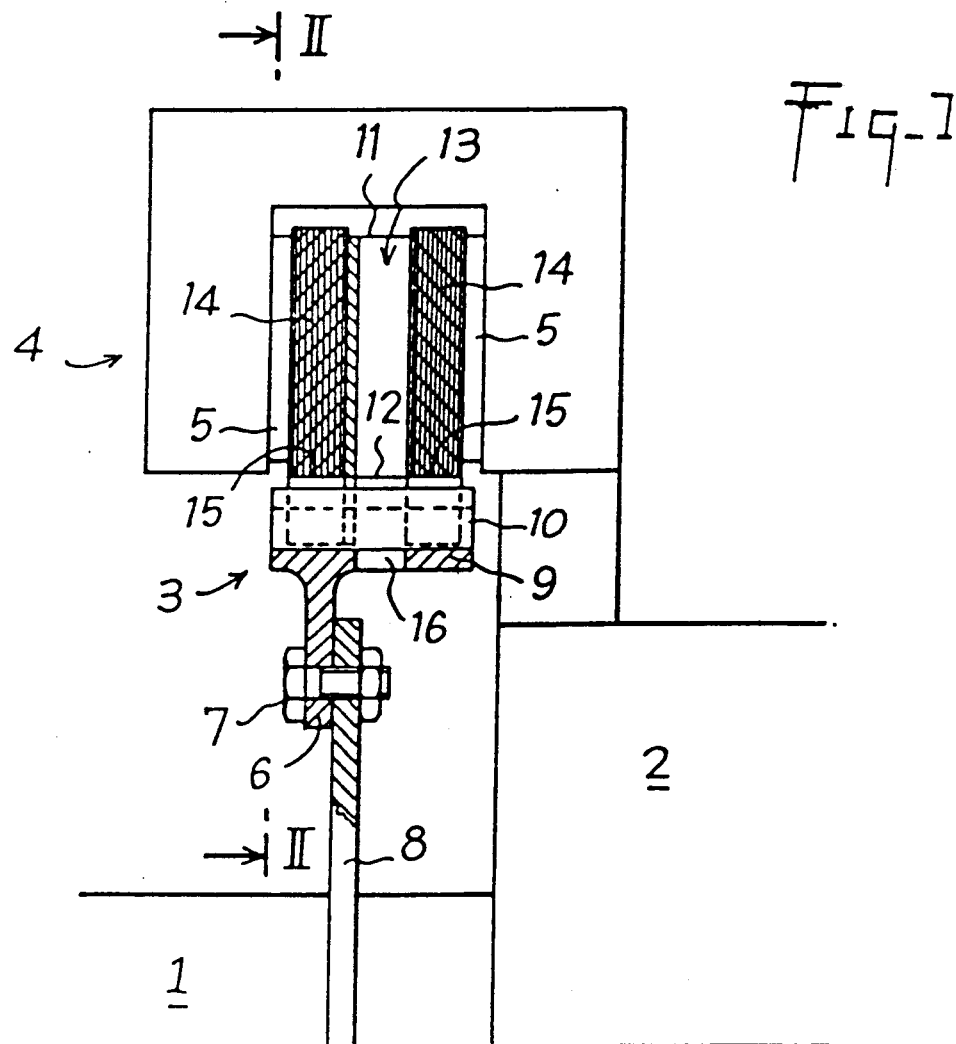
FIG. 1 is an elevational half-sectional view of a brake comprising an improved disk according to the invention.
Figure 2:
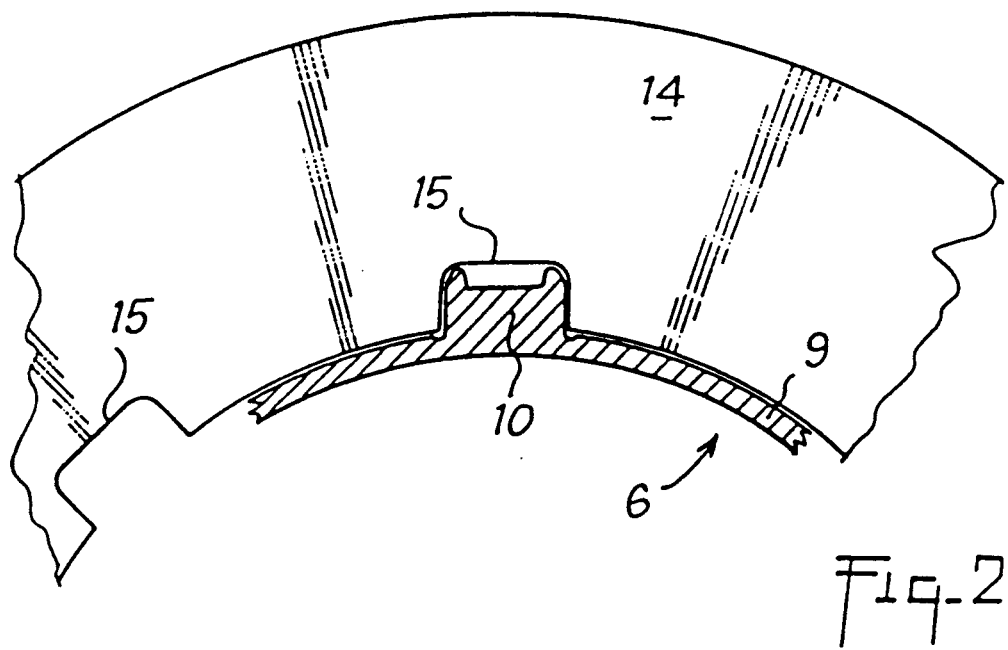
FIG. 2 is a half-elevational view corresponding to line II—II of FIG. 1.

Referring now to FIGS. 1 and 2, these show the improved disk applied to the braking and stopping of a rotary part constituted by an axle or a hub 1 mounted in a fixed hub-carrier 2. The hub 1 can be of any type, depending on the proposed application, and for example it can constitute the hub of a vehicle wheel, with respect to which the hub-carrier 2 forms part of the carrying structure.

But the invention should also be considered to be equally applicable to a reverse arrangement in a different field of application.

FIG. 1 illustrates one example of embodiment of a single-disk type brake. But the invention could also be applied to a multi-disk type brake.

According to the embodiment of FIG. 1, the brake comprises a disk 3 called rotor, which is designed to cooperate with at least one fixed friction member 4. The fixed member 4 can be a stator disk or, as illustrated in FIG. 1, a caliper mounted on the hub-carrier 2 so as to straddle the disk 3, against either side of which disk it applies the friction plates 5 actuated in such a way as to clamp the disk 3, by any means conventionally used in braking technique.

The rotor disk 3 comprises, according to the invention, a driving drum 6 which is fastened by bolts 7 on a flange 8 integral with the rotary part 1. The driving drum 6 forms, on his periphery, a cylindrical wall 9 which is provided in places with angularly equidistant teeth 10, projecting outwardly. Said teeth 10 are designed to serve for mounting the elements constituting the disks in the meaning of the invention.

Disk 3 is composed, primarily, of a central web 11, produced in any suitable material, capable of showing the properties of mechanical strength required for the proposed application, in particular the transmission of the torque. The selection of the material constituting the central web 11 is also ruled by the necessity of allowing for a heat-exchanging capacity. For example, the central web 11 can be produced in cast iron, steel, titanium, aluminium, or even a composite material, such as carbon-carbon.

The central web 11 is produced so as to comprise, on its inner peripheral edge, notches 12 which are designed to allow a slidable mounting on the drum 6 by cooperating with the teeth 10.

The central web 11 is produced, by any manufacturing means suited to the nature of the selected constituting material, so as to provide, in its thickness, channels 13 formed between the inner and outer peripheral edges, and open on the level of said edges. Said channels 13 are angularly equidistant, and, in the example illustrated in FIG. 3, they are disposed radially. According to a preferred arrangement, the channels 13 are open on one side face of the web 11 and on the other, alternately. Said channels 13 can be formed by a machining operation, or appropriately when the web 11 is constructed, or by drawing, die-stamping, molding, etc . . .

The disk 3 is further composed of two friction and wear surfaces or flanges 14, which are preferably produced in carbon-carbon or any other friction material. Said surfaces or flanges 14 are solid and monobloc and have a constant thickness. Said surfaces or flanges 14 are machined or produced in such a way as to comprise on the peripheral inner edge, recesses or notches 15 allowing the movable mounting of the drum 6 on the teeth 10. Said surfaces or flanges 14 are mounted on the driving drum 6 on either side of the web 11 in facing relation to which they are freely slidable with respect to the disc. Said surfaces or flanges 14 contribute to closing the channels 13 which are open on one of the side faces of the web 11 and on the other, successively.

The surfaces or flanges 14 constitute the friction parts designed to cooperate with the fixed parts 5 produced in the form of plates or stator disks.

The driving drum 6 is also designed so as to present, in the central part of its peripheral wall 9, openings or ports 16 provided in places, or preferably, coinciding with at least some of the channels 13. Thus, by rotating the disk 3, a centrifugal-type circulation of air is kept up, which uses all the holes 16 and all the channels 13 to take up some of the calories which are then transmitted to the web 11 via the surfaces or flanges 14 when these cooperate with the friction members 5, in order to slow down or to stop the rotation of the rotary part 1.

Accordingly, web 11 constitutes a mechanically strong part which can withstand the pressure stresses applied on the surfaces or flanges 14 by friction members 5. Web 11 also constitutes a heat exchanger enabling the disk 3 to be kept at the suitable temperature for the brake to work correctly. To this effect, the construction or structure of the web 11 can be so determined as to adjust the heat-exchanging function, in relation to the proposed application.

The disk according to the invention thus comprises three elementary parts which are mounted on the same driving drum so as to be slidable with respect to said drum and relatively free. Said structure is particularly adapted for compensating the differential expansions due to the fact that different materials have been used for producing the three elementary parts or that different temperatures are imposed, depending on the conditions of use. In addition to the aforesaid advantages, it is worth noting that the structure of the disk according to the invention makes it possible for the web 11 to be reused, at discretion, together with wear surfaces or flanges which can be produced in materials with high friction properties. Accordingly, a disk 3 according to the invention can present optimum braking characteristics, for a manufacturing and maintenance price which is lower than that of other disk produced in one piece from the same material.

A further object of the invention is to produce the central web 11 in a material which is more specifically selected for its adaptability to heat exchanges, while the material for producing the wear surfaces or flanges is selected for its adaptability to the friction function.

Figure 3:
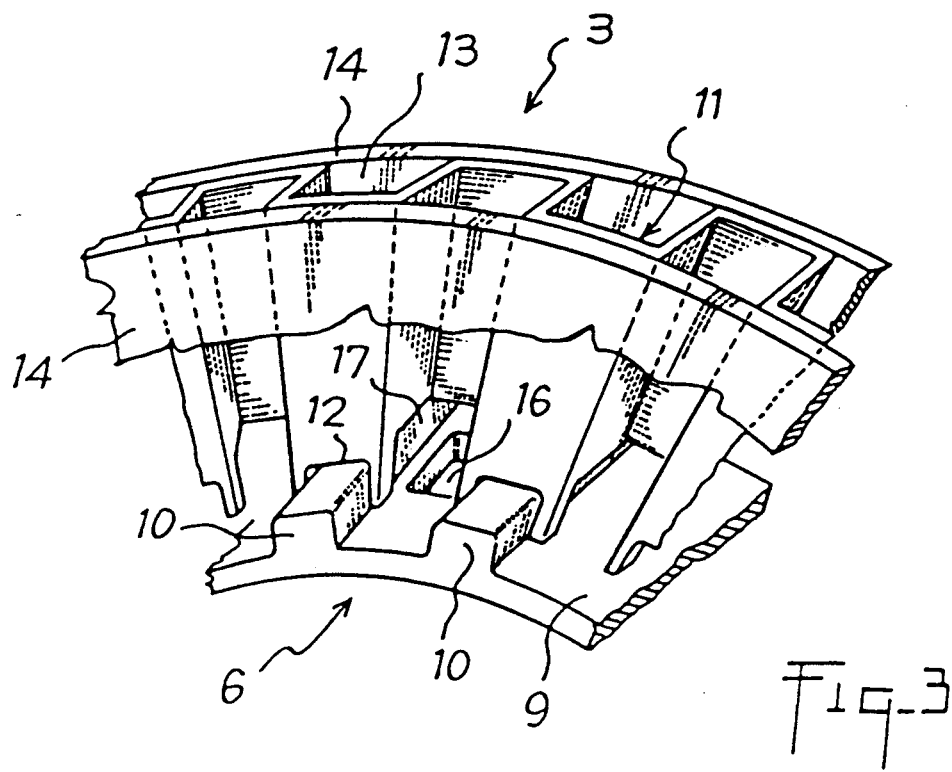
FIG. 3 is a partial perspective view of an embodiment of one of the elements constituting the object of the invention.

In the embodiment illustrated in FIG. 3, the channels 13 are substantially radially oriented. It is possible to produce the web with channels inclined in the direction of rotation of the disk 3. Such an orientation will help the centrifugal circulation even more and will contribute to improving the heat-exchanging performance of the web 11.

It is indicated in the foregoing that some at least of the channels 13 coincide with ports or hole 16 in the drum 6. It is also possible to produce the web 11 so that the different channels 13 issue into a lower passage provided in the peripheral inner edge of the web 11. Such a passage, designated by reference 17, permits a peripheral circulation from the holes 16 and a centrifugal flow through the different channels 13.

Figure 4:
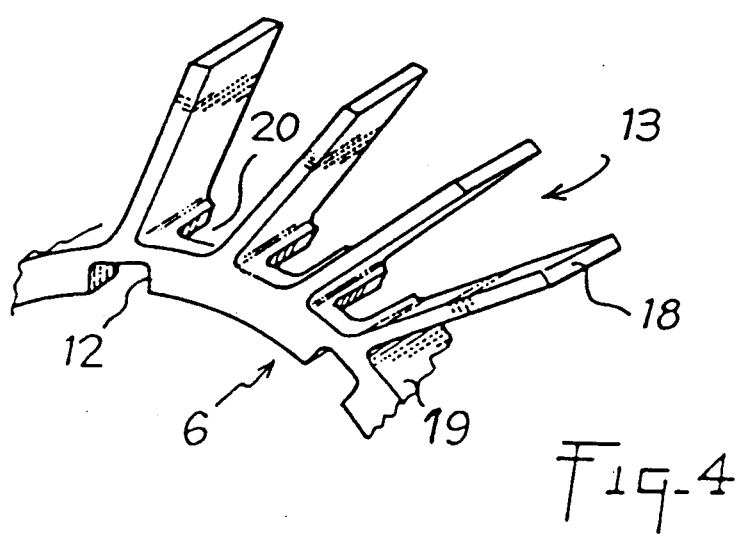
FIG. 4 is a partial perspective showing a variant embodiment of the constituting element according to FIG. 3.

FIG. 4 illustrates a variant embodiment in which the web 11 comprises, on its periphery, small blades 18, which are angularly equidistant and disposed radially or non-radially, and which contribute to defining the channels 13 by cooperating with the faces in opposite relationship of the wear surfaces or flanges 14 placed on either side of said web.

In such a case, the blades 18 extend from a ring 19 in which are provided recesses or notches 12 as well as openings 20 formed between the different blades 18 in order to admit cooling air from the holes 16.

The invention is not in any way limited to the description given hereinabove and, on the contrary, covers any modification that can be brought thereto without departing from its scope.

I claim:

1. An improved rotor for a disk brake comprising:
   (a) a hub portion rotatable about a central axis;
   (b) a driving portion having a radially outward surface defining at least one driving tooth;
   (c) a central web having a plurality of spacing members and defining at least one driving notch adapted to slidably receive the at least one driving tooth such that the central web may move in a direction generally parallel to the central axis with respect to the driving portion, but may not rotate relative thereto; and,
   (d) a generally annular friction element formed separately from and located on each lateral side of the central web, each friction element defining a recess adapted to slidably receive the at least one driving tooth such that the friction elements may move in a direction generally parallel to the longitudinal axis separately from the central web, but may not rotate relative to the driving portion.

2. Improved rotor as claimed in claim 1 wherein the central web defines channels, at least some of which communicate with holes defined by the driving portion.

3. Improved rotor as claimed in claim 2 wherein the channels are open on alternate lateral sides of the central web.

4. Improved rotor as claimed in claim 2 wherein the channels are defined between successive blades formed on the central web and by the opposite faces of the friction elements.

5. Improved rotor as claimed in claim 1 wherein the central web defines generally radially oriented channels, at least some of which communicate with holes defined by the driving portion.

6. Improved rotor as claimed in claim 1 wherein the central web defines channels which are inclined in a direction of rotation of the driving portion at least some of which communicate with holes defined by said driving portion.

7. Improved rotor as claimed in claim 1 further comprising means to detachably mount the driving portion on the hub portion.

* * * * *